(12) United States Patent
Tabata et al.

(10) Patent No.: US 12,183,180 B2
(45) Date of Patent: Dec. 31, 2024

(54) INFORMATION PROCESSING DEVICE, VEHICLE, AND STORAGE MEDIUM

(71) Applicant: TOYOTA JIDOSHA KABUSHIKI KAISHA, Toyota (JP)

(72) Inventors: Mitsuhiro Tabata, Sunto-gun (JP); Motoki Takahashi, Susono (JP); Naofumi Magarida, Sunto-gun (JP); Yuko Azuma, Numazu (JP); Takaharu Tateishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 289 days.

(21) Appl. No.: 17/885,660

(22) Filed: Aug. 11, 2022

(65) Prior Publication Data
US 2023/0062696 A1    Mar. 2, 2023

(30) Foreign Application Priority Data
Aug. 31, 2021 (JP) .................. 2021-141011

(51) Int. Cl.
  *G08B 21/18*  (2006.01)
  *G08B 5/22*  (2006.01)
  *H04N 7/18*  (2006.01)

(52) U.S. Cl.
  CPC ............. *G08B 21/185* (2013.01); *G08B 5/22* (2013.01); *H04N 7/183* (2013.01)

(58) Field of Classification Search
  CPC .................................................. G08B 21/185
  See application file for complete search history.

(56) References Cited

U.S. PATENT DOCUMENTS

| | | | | |
|---|---|---|---|---|
| 7,805,223 | B2* | 9/2010 | Yamaguchi | G05B 15/02 701/1 |
| 8,712,621 | B2* | 4/2014 | Saito | B60L 15/20 74/498 |
| 9,126,486 | B2* | 9/2015 | Kinomura | B60L 53/65 |
| 10,252,621 | B2* | 4/2019 | Yumita | H02M 3/04 |
| 11,727,778 | B2* | 8/2023 | De Blonde | G06F 13/1668 340/578 |
| 2009/0039839 | A1* | 2/2009 | Noguchi | B60L 58/20 429/430 |

(Continued)

FOREIGN PATENT DOCUMENTS

| JP | 2011-10399 A | 1/2011 |
|---|---|---|
| JP | 2012-257404 A | 12/2012 |

(Continued)

*Primary Examiner* — Travis R Hunnings
(74) *Attorney, Agent, or Firm* — Oblon, McClelland, Maier & Neustadt, L.L.P.

(57) ABSTRACT

An information processing device includes a processor configured to: acquire connection information representing a state of a connection region including a connection portion that connects a vehicle and a power supply target such that power is able to be supplied; determine whether the connection information includes information indicating an abnormality in the connection portion; and output information that issues a notification that the connection portion is abnormal when the processor determines that the connection information includes the information indicating an abnormality in the connection portion.

17 Claims, 3 Drawing Sheets

(56) References Cited

U.S. PATENT DOCUMENTS

| | | | |
|---|---|---|---|
| 2009/0109021 A1* | 4/2009 | Paoletti | G01R 31/343 |
| | | | 702/184 |
| 2012/0193983 A1* | 8/2012 | Yukizane | B60L 53/305 |
| | | | 307/9.1 |
| 2014/0035512 A1* | 2/2014 | Kamachi | H02J 7/0042 |
| | | | 320/109 |
| 2015/0224889 A1* | 8/2015 | Ono | B60W 20/00 |
| | | | 903/903 |
| 2015/0263560 A1* | 9/2015 | Ono | B60L 50/15 |
| | | | 320/136 |
| 2015/0375621 A1* | 12/2015 | Ono | B60L 1/006 |
| | | | 307/10.1 |

FOREIGN PATENT DOCUMENTS

| | | |
|---|---|---|
| JP | 2015-050894 A | 3/2015 |
| JP | 2019-193365 A | 10/2019 |
| WO | WO 2013/105125 A1 | 7/2013 |
| WO | WO 2014/156150 A1 | 10/2014 |

\* cited by examiner

INFORMATION PROCESSING DEVICE, VEHICLE, AND STORAGE MEDIUM

CROSS-REFERENCE TO RELATED APPLICATION

This application claims priority to Japanese Patent Application No. 2021-141011 filed on Aug. 31, 2021, incorporated herein by reference in its entirety.

BACKGROUND

1. Technical Field

The present disclosure relates to an information processing device, a vehicle, and a storage medium.

2. Description of Related Art

Japanese Unexamined Patent Application Publication No. 2015-50894 (JP 2015-508942 A) discloses a vehicle capable of supplying power to a power supply target such as a house outside.

SUMMARY

When the vehicle disclosed in JP 2015-50894 A supplies power, there is a possibility that an abnormality occurs in a connection portion between the vehicle and a power supply target. Thus, there has been a demand for a technique capable of detecting an abnormality occurring at a connection portion between a vehicle and a power supply target during power supply.

The present disclosure has been made in view of the above, and an object of the present disclosure is to provide an information processing device, a vehicle, and a storage medium capable of detecting an abnormality occurring in a connection portion between a vehicle and a power supply target during power supply.

An information processing device according to the present disclosure includes a processor configured to: acquire connection information representing a state of a connection region including a connection portion that connects a vehicle and a power supply target such that power is able to be supplied; determine whether the connection information includes information indicating an abnormality in the connection portion; and output information that issues a notification that the connection portion is abnormal when the processor determines that the connection information includes the information indicating an abnormality in the connection portion.

A vehicle according to the present disclosure includes a processor configured to: acquire connection information representing a state of a connection region including a connection portion that connects the vehicle and a power supply target such that power is able to be supplied; determine whether the connection information includes information indicating an abnormality in the connection portion; and output information that issues a notification that the connection portion is abnormal when the processor determines that the connection information includes the information indicating an abnormality in the connection portion.

A storage medium according to the present disclosure stores a program that causes a processor to execute: acquiring connection information representing a state of a connection region including a connection portion that connects a vehicle and a power supply target such that power is able to be supplied; determining whether the connection information includes information indicating an abnormality in the connection portion; and outputting information that issues a notification that the connection portion is abnormal when the processor determines that the connection information includes the information indicating an abnormality in the connection portion.

According to the present disclosure, it is possible to detect an abnormality occurring at a connection portion between a vehicle and a power supply target during power supply.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An information processing device, a vehicle, and a program according to the embodiment of the present disclosure will be described with reference to the drawings. Note that, constituent components in the following embodiment also include those that can be easily replaced by those skilled in the art, or those that are substantially identical.

Embodiment

Figure 1:
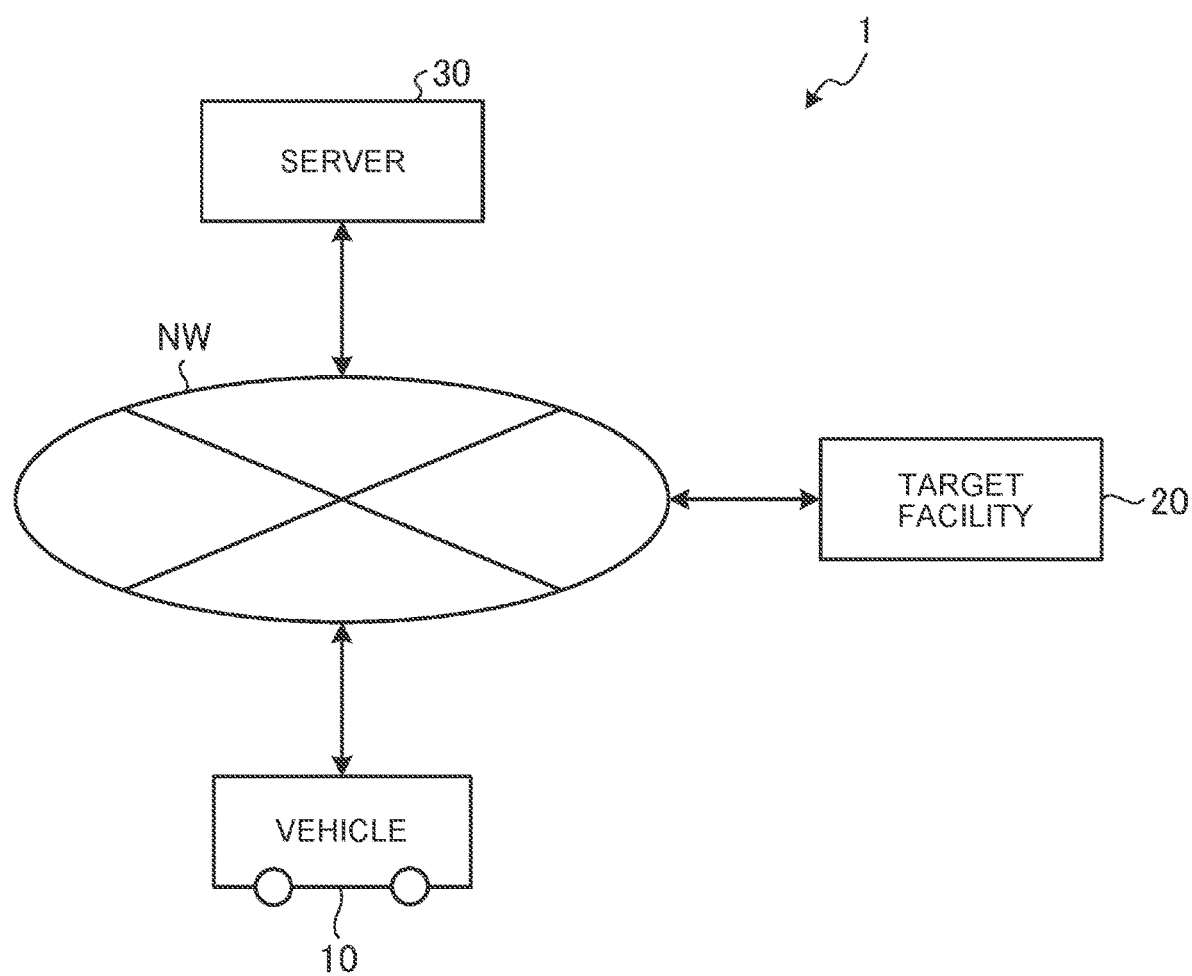
FIG. 1 is a diagram schematically showing a configuration of the power supply system including the information processing device according to an embodiment.

A power supply system including according to the embodiment will be described with reference to FIGS. 1 to 3. FIG. 1 is a diagram schematically showing a configuration of a power supply system including the information processing device according to the embodiment. As shown in FIG. 1, a power supply system 1 includes a vehicle 10, a target facility 20, and a server 30. In the power supply system 1, for example, the server 30 assists the power supply from the vehicle 10 to the target facility 20.

The vehicle 10, the target facility 20, and the server 30 are configured to be able to communicate with each other through a network NW. The network NW is, for example, a public communication network such as the Internet, and may include a wide area network (WAN), a telephone communication network, and other communication networks such as a wireless communication network including Wi-Fi (registered trademark).

Further, for example, communication between the vehicle 10 and the target facility 20 is not limited to being performed via the network NW, and the vehicle 10 and the target facility 20 may be able to communicate directly with each other without the network NW. As a result, even if the network NW cannot be used in the event of a disaster, power can be supplied from the vehicle 10 to the target facility 20.

The vehicle 10 is an autonomous traveling vehicle configured to be able to travel autonomously in accordance with at least a given traveling command. The vehicle 10 can supply a part of the electric power generated by driving an engine with fuel such as gasoline or hydrogen, or a part of the power stored in a power supply device to the outside.

The target facility 20 is a facility to be supplied with power such as a house to which the vehicle 10 is to be supplied with power.

Figure 2:
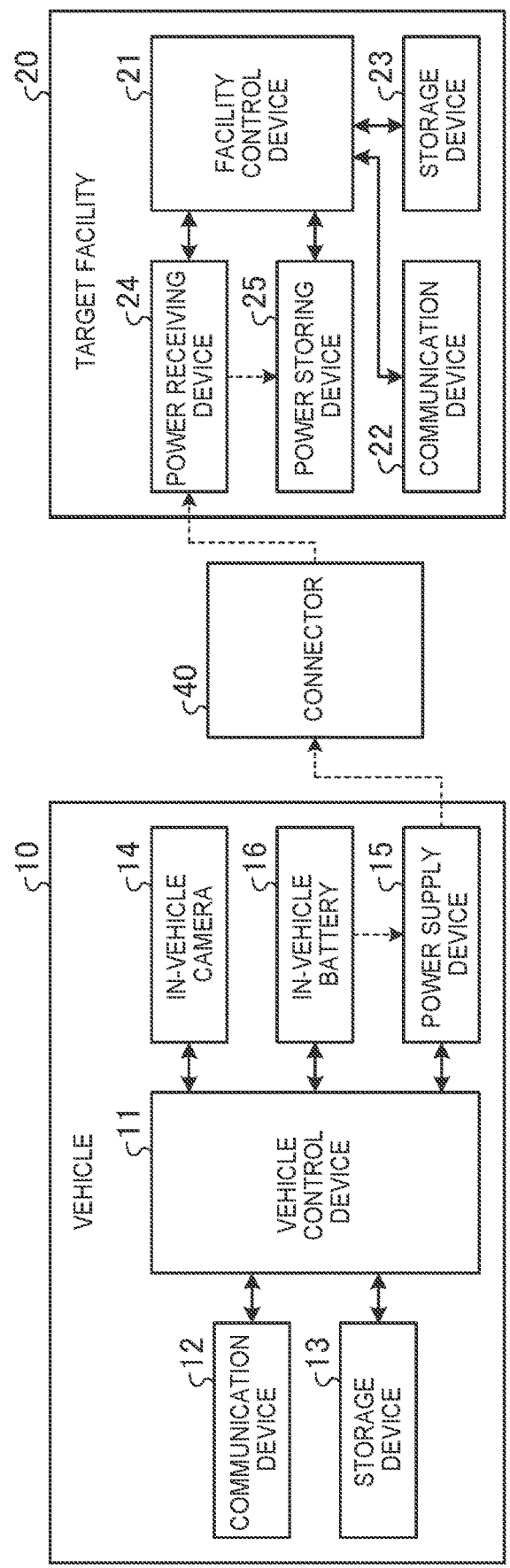
FIG. 2 is a diagram schematically showing a state in which the vehicle and a target facility are connected by a connector.

FIG. 2 is a diagram schematically showing a state in which the vehicle and a target facility are connected by a connector. The vehicle 10 includes a vehicle control device 11, a communication device 12, a storage device 13, an in-vehicle camera 14, a power supply device 15, and an in-vehicle battery 16.

The vehicle control device 11 is provided with a processor including a central processing unit (CPU), a digital signal processor (DSP), a field-programmable gate array (FPGA), etc., and a memory including a random access memory (RAM), a read-only memory (ROM), etc. The vehicle control device 11 loads a program stored in the storage device 13 into the work area of the memory and executes the program, and controls each component, etc. through the execution of the program such that the function that satisfies a predetermined purpose can be realized.

The vehicle control device 11 acquires connection information representing the state of a connection region including a connection portion that connects the vehicle 10 and the target facility 20 such that power can be supplied. The connection information includes, for example, an image including the connection portion captured by an in-vehicle camera of the vehicle 10. Further, the vehicle control device 11 determines whether the acquired connection information includes information indicating an abnormality in the connection portion. The vehicle control device 11 determines that the connection portion is abnormal, for example, when it is detected that the connection portion has a temperature equal to or higher than a predetermined temperature. Specifically, in the image captured by the in-vehicle camera 14, when the vehicle control device 11 detects a change in color, etc. in the image due to the temperature of the connecting portion and the peripheral portion thereof becoming higher than a predetermined temperature, the vehicle control device 11 determines that the connection portion is abnormal. Further, the vehicle control device 11 is configured to output information notifying that the connection unit is abnormal when it is determined that the vehicle control device 11 includes information indicating an abnormality of the connection portion.

The communication device 12 is composed of, for example, a local area network (LAN) interface board, a wireless communication circuit for wireless communication, and the like. The communication device 12 is connected to the network NW such as the Internet that is a public communication network. The communication device 12 communicates with the target facility 20 and the server 30 by connecting to the network NW.

The storage device 13 is configured of a recording medium (storage medium) such as an erasable programmable ROM (EPROM), a hard disk drive (HDD), and a removable medium. Examples of the removable medium include recording media such as an optical disc (e.g. compact disc (CD)-R or CD-ROM, digital versatile disc (DVD)-R or DVD-ROM, Blu-ray (registered trademark) disc) and a flash memory (e.g. a universal serial bus (USB) memory, a memory card). The storage device 13 can store an operating system (OS), various programs, various tables, various databases, and the like.

The in-vehicle camera 14 may be, for example, a front camera or a back camera provided in the vehicle. The in-vehicle camera 14 captures a region including at least a part of the connector 40 as the connection region including the connection portion between the vehicle 10 and the target facility 20.

The power supply device 15 is an inlet to which the connection portion of a connector 40 is connected, and power is supplied to the power receiving device 24 via the connector 40 in a contact manner.

The in-vehicle battery 16 is composed of, for example, a secondary battery such as a nickel-metal hydride battery or a lithium-ion battery, and supplies electric power to a drive device including a motor or an inverter of the vehicle 10. Further, the in-vehicle battery 16 may be configured to be rechargeable with power of the driven engine. When the vehicle 10 is a gasoline-powered vehicle, it may be configured not to have the in-vehicle battery 16.

The target facility 20 includes a facility control device 21, a communication device 22, a storage device 23, the power receiving device 24, and a power storage device 25. The physical configurations of the facility control device 21, the communication device 22, and the storage device 23 are the same as, for example, the configurations of the vehicle control device 11, the communication device 12, and the storage device 13 included in the vehicle 10, respectively.

The power receiving device 24 receives the electric power from the power supply device 15 via the connector 40. The power receiving device 24 has a connection portion such as an outlet connected to the connector 40.

The power storage device 25 is composed of, for example, a secondary battery such as a nickel hydrogen battery or a lithium ion battery, and stores electric power that is used in the target facility 20.

The connector 40 connects the power supply device 15 of the vehicle 10 and the power receiving device 24 of the target facility 20. The connector 40 has a connection portion connected to the inlet of the power supply device 15 and an outlet insertion slot to which an outlet of the power receiving device 24 is connected.

Figure 3:
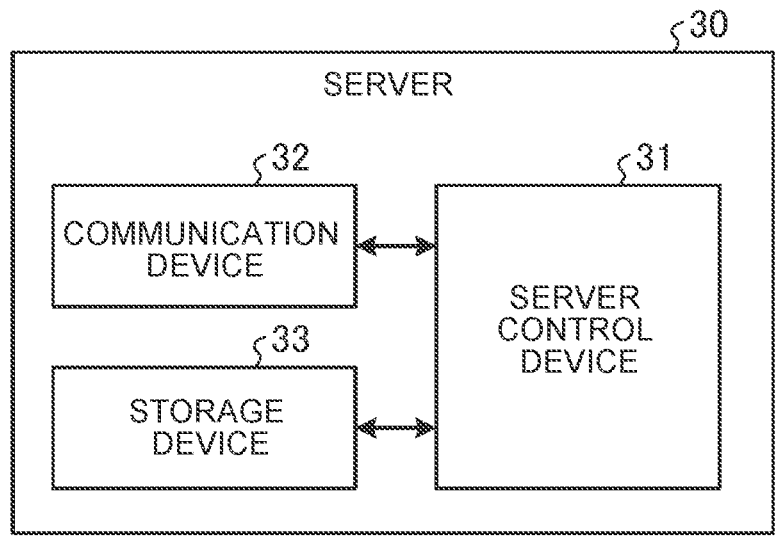
FIG. 3 is a diagram showing a schematic configuration of a server.

FIG. 3 is a diagram showing a schematic configuration of the server. The server 30 includes a server control device 31, a communication device 32, and a storage device 33. The physical configurations of the server control device 31, the communication device 32, and the storage device 33 are the same as, for example, the configurations of the vehicle control device 11, the communication device 12, and the storage device 13 included in the vehicle 10, respectively.

Figure 4:
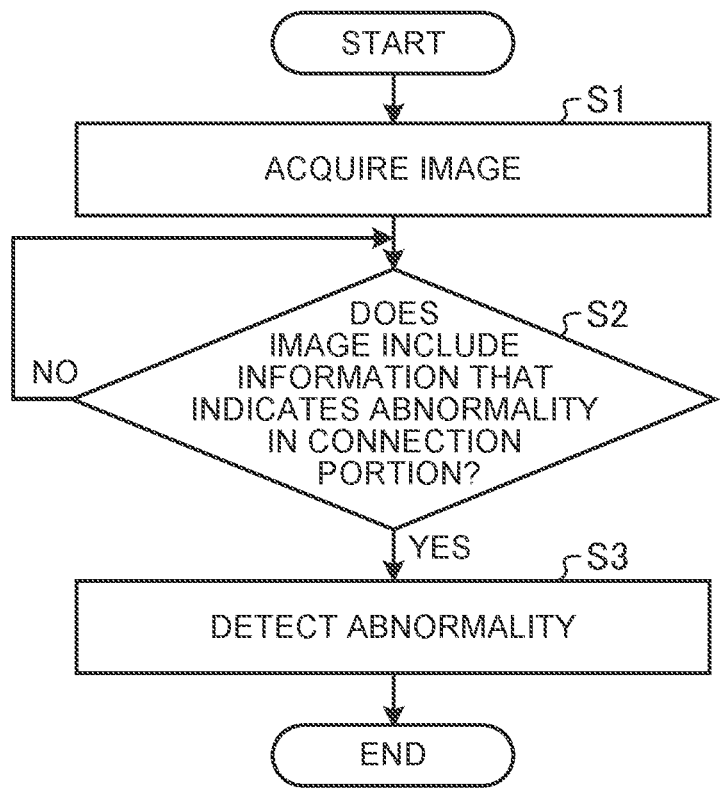
FIG. 4 is a flowchart showing a process executed by a vehicle control device.

Next, a process executed by the vehicle control device 11 will be described. FIG. 4 is a flowchart showing a process executed by the vehicle control device. First, the vehicle control device 11 acquires an image captured by the in-vehicle camera 14 as the connection information (step S1). The vehicle control device 11 may guide a user such that the connection portion is included in the range captured by the in-vehicle camera 14 at the start of power supply. Further, the vehicle control device 11 may manually or automatically adjust the capturing range of the in-vehicle camera 14 such that the connection portion is included in the range captured by the in-vehicle camera 14 at the start of power supply. The connection portion includes at least a part of the power supply device 15, the power receiving device 24, or the connector 40, and the connection region includes the peripheral portion of the connection portion.

Subsequently, the vehicle control device 11 determines whether the image captured by the in-vehicle camera 14 includes information indicating an abnormality in the connection portion (step S2). Specifically, the vehicle control device 11 determines whether the color of the connector 40 has changed in the image captured by the in-vehicle camera 14. Depending on the color of the connector 40, it is possible to detect that the color of an outer skin of the connector 40 is changed when the temperature of the connector 40 becomes higher than a predetermined temperature. The outer periphery of the connector 40 may be coated with a thermochromic paint or the like in which the color changes when the temperature rises above a predetermined temperature. Further, the vehicle control device 11 may detect that the color of something around the connector 40 changes due to the heat from the connector 40. When the vehicle control device 11 determines that the connection information does not include the information indicating an abnormality of the connection portion (step S2: No), the step S2 is repeated and the monitoring of the connection portion is continued.

When the vehicle control device 11 determines that the connection information includes the information indicating an abnormality in the connection portion (step S2: Yes), the vehicle control device 11 notifies a manager of the preset vehicle 10 that the connection portion is abnormal (step S3). Then, the vehicle control device 11 ends the series of processes.

With the vehicle control device 11 according to the embodiment described above, since the vehicle control device 11 detects an abnormality occurring in the connection portion based on the connection information, a notification of an abnormality of the connection portion between the vehicle 10 and the target facility 20 during power supply can be issued. In particular, since the capacity of power supply by the vehicle 10 has been increasing in recent years, a technique for monitoring an abnormally high temperature during power supply is desired, and according to the vehicle control device 11, it is possible to detect an abnormally high temperature during power supply.

Further, the connection information may include information of the connection portion acquired by the thermography of the vehicle 10. At this time, when the vehicle control device 11 detects that the temperature of the connector 40 exceeds a predetermined temperature in the information acquired by the thermography, the vehicle control device 11 may determine that the connection portion is abnormal.

Further, the connection information may include a detection value of a temperature sensor provided in the connection portion. At this time, when the vehicle control device 11 detects that the detection value of the temperature sensor corresponds to a predetermined temperature or higher, the vehicle control device 11 may determine that the connection portion is abnormal.

Further, when the connection of the connection portion is disconnected without performing a predetermined authentication, the vehicle control device 11 may determine that the connection portion is abnormal. The predetermined authentication is authentication using a password biometric authentication, or the like, for disconnecting the connection portion. Further, the vehicle control device 11 detects the connection between the power supply device 15 and the connector 40, or the disconnection between the power receiving device 24 and the connector 40, based on the image of the connection portion captured by the in-vehicle camera 14.

This suppresses situations such as the power supply being terminated unintentionally by the manager of the vehicle 10, an operation not intended by the manager being performed in the vehicle 10 during power supply, or the vehicle 10 being stolen during power supply.

Further, the vehicle control device 11 may output information notifying that the target facility 20 is abnormal. Specifically, the vehicle control device 11 acquires an image including the target facility 20 captured by the in-vehicle camera 14 as the target information representing the state of the target facility 20. Then, the vehicle control device 11 determines whether the target information includes information indicating an abnormality of the target facility 20. For example, in a situation where an entrance of the target facility 20 cannot be locked due to a disaster or the like, when the in-vehicle camera 14 captures an image of the entrance as target information, as a result of the vehicle control device 11 analyzing the image, the vehicle control device 11 determines that the target information includes information indicating an abnormality. As a result, not only an abnormality of the connection portion between the vehicle 10 and the target facility 20 but also an abnormality of the target facility 20 can be detected.

Further effects and modifications can be easily derived by those skilled in the art. The broader aspects of the present disclosure are not limited to the particular details and representative embodiments shown and described above. Accordingly, various modifications may be made without departing from the spirit or scope of the general concept of the disclosure defined by the appended claims and their equivalents. For example, via the network NW or the like, the facility control device 21 of the target facility 20 or the server control device 31 of the server 30 may acquire connection information representing the state of a connection region including a connection portion that connects the vehicle 10 and the target facility 20 such that power is able to be supplied, determine whether the connection information includes information indicating an abnormality in the connection portion, and send a notification that the connection portion is abnormal when it is determined that the information indicating an abnormality of the connection portion is included.

What is claimed is:

1. An information processing device comprising a processor configured to:
  acquire connection information representing a state of a connection region including a connection portion that connects a vehicle and a power supply target such that power is able to be supplied;
  determine whether the connection information includes information indicating an abnormality in the connection portion;
  output information that issues a notification that the connection portion is abnormal when the processor determines that the connection information includes the information indicating an abnormality in the connection portion; and
  determine that the connection portion is abnormal when the processor detects that a connection of the connection portion is disconnected without a predetermined authentication being performed.

2. The information processing device according to claim 1, wherein the connection information includes an image including the connection portion captured by an in-vehicle camera provided in the vehicle.

3. The information processing device according to claim 1, wherein the connection information includes information of the connection portion acquired by a thermography provided in the vehicle.

4. The information processing device according to claim 1, wherein the connection information includes a detection value of a temperature sensor provided in the connection portion.

5. The information processing device according to claim 1, wherein the processor determines that the connection portion is abnormal when the processor detects that the connection portion has a temperature equal to or higher than a predetermined temperature.

6. The information processing device according to claim 1, wherein the processor:
acquires target information representing a state of the power supply target;
determines whether the target information includes information indicating an abnormality in the power supply target; and
outputs information that issues a notification that the power supply target is abnormal when the processor determines that the target information includes the information indicating an abnormality in the power supply target.

7. A vehicle comprising a processor configured to:
acquire connection information representing a state of a connection region including a connection portion that connects the vehicle and a power supply target such that power is able to be supplied;
determine whether the connection information includes information indicating an abnormality in the connection portion;
output information that issues a notification that the connection portion is abnormal when the processor determines that the connection information includes the information indicating an abnormality in the connection portion; and
determine that the connection portion is abnormal when a connection of the connection portion is disconnected without a predetermined authentication being performed.

8. The vehicle according to claim 7,
comprising an in-vehicle camera that captures an image including the connection portion,
wherein the connection information includes the image captured by the in-vehicle camera.

9. The vehicle according to claim 7,
comprising a thermography that acquires information of the connection portion,
wherein the connection information includes the information acquired by the thermography.

10. The vehicle according to claim 7,
comprising a temperature sensor provided in the connection portion,
wherein the connection information includes a detection value of the temperature sensor.

11. The vehicle according to claim 7, wherein the processor determines that the connection portion is abnormal when the processor detects that the connection portion has a temperature equal to or higher than a predetermined temperature.

12. The vehicle according to claim 7, wherein the processor:
acquires target information representing a state of the power supply target;
determines whether the target information includes information indicating an abnormality in the power supply target; and
outputs information that issues a notification that the power supply target is abnormal when the processor determines that the target information includes the information indicating an abnormality in the power supply target.

13. A non-transitory storage medium that stores a program that causes a processor to execute:
acquiring connection information representing a state of a connection region including a connection portion that connects a vehicle and a power supply target such that power is able to be supplied;
determining whether the connection information includes information indicating an abnormality in the connection portion;
outputting information that issues a notification that the connection portion is abnormal when the processor determines that the connection information includes the information indicating an abnormality in the connection portion; and
determining that the connection portion is abnormal when a connection of the connection portion is disconnected without a predetermined authentication being performed.

14. The storage medium according to claim 13, wherein the connection information includes an image including the connection portion captured by an in-vehicle camera provided in the vehicle.

15. The storage medium according to claim 13, wherein the connection information includes information of the connection portion acquired by an in-vehicle thermography provided in the vehicle.

16. The storage medium according to claim 13, wherein the connection information includes a detection value of a temperature sensor provided in the connection portion.

17. The storage medium according to claim 13 that causes the processor to execute determining that the connection portion is abnormal when the processor detects that the connection portion has a temperature equal to or higher than a predetermined temperature.

* * * * *